United States Patent Office 2,888,486
Patented May 26, 1959

2,888,486
PROCESS FOR PRODUCING AROMATIC SULFONYL HALIDES

Walter A. Gregory, Wilmington, Del., assignor to E. I. du Pont de Nemours and Company, Wilmington, Del., a corporation of Delaware No Drawing. Application November 20, 1953
Serial No. 393,492

7 Claims. (Cl. 260—543)

This invention relates to processes for the preparation of organo sulfonyl chlorides and bromides.

The general reaction of an aryl sulfonic acid, either free or in the form of a metal salt, with a phosphorous halide to give an aryl sulfonyl chloride is well known (see, for example, Fieser and Fieser, "Organic Chemistry," page 594 (D. C. Heath & Company, 1944). The use of thionyl chloride as the halide reactant has also been suggested (P. V. Hearst and C. R. Noller, Org. Synth. 30, 58 (1950)). According to these prior art practices, however, fairly rigorous conditions such as heating to 100° C. or higher are required. Also the reaction is not broadly applicable to the preparation of all organo sulfonyl chlorides or bromides. For example, if the organo radical of the organo sulfonyl reactant is aryl having one or more electronegative substituents (e.g. sodium p-acetylbenzene sulfonate, m-formylbenzene sulfonic acid, and the like) the reaction proceeds even at high temperatures only with a strong chlorinating agent such as phosphorous pentachloride but unfortunately under such conditions, the chlorinating agent also reacts with the electronegative substituent thus giving poor yields of the desired product.

I have found a new and improved process which overcomes shortcomings of the process used heretofore. My new process is broadly useful in the preparation of organo sulfonyl chlorides and bromides. It does not require high temperatures as heretofore but rather can be carried out at about room temperature or below. Better yield and purity of product are obtained. In the process, one can also use sulfuryl chloride, phosphorous trichloride or their bromine analogues as the halogenating agent as well as the agents generally used heretofore such as phosphorous pentachloride, phosphorous oxychloride, and thionyl chloride and their bromine analogues.

According to this invention, the reaction of an organo sulfonic acid or a salt thereof with a halogenating agent of the kind named above is carried out in the presence of a dimethyl amide represented by the formula ZCON(CH$_3$)$_2$ where Z is hydrogen, methyl, or dimethylamino; in other words, in the presence of dimethylformamide, dimethylacetamide, or tetramethylurea.

The general reaction is represented by the equation

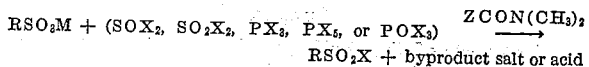

$$RSO_3M + (SOX_2, SO_2X_2, PX_3, PX_5, \text{ or } POX_3) \xrightarrow{ZCON(CH_3)_2} RSO_2X + \text{byproduct salt or acid}$$

where R is an organic radical linked to the sulfur atom thru a carbon atom, X is chlorine or bromine, and Z, as mentioned previously, is hydrogen, methyl or dimethylamino.

In the organo sulfonyl reactant, represented by the formula RSO$_3$M herein, R can be any organic radical linked to sulfur thru a carbon atom. Thus, for example, R can be alkyl, alkenyl, cycloalkyl, aryl, alkaryl, aralkyl, or conjugated, unsaturated, or saturated heterocyclic; or such radicals substituted by one or more groups such as, for example, alkyl, alkoxy, carboalkoxy, acyloxy, acylamido, acyl, formyl, alkenyl, cyano, halogen, nitro, alkyl mercapto, aryl mercapto, alkylsulfinyl, arylsulfinyl, alkylsulfonyl, arylsulfonyl, and alkenylsulfonyl. The process of the invention is especially useful where R is phenyl having an electronegative group (e.g. acetyl, formyl, carboxymethoxy, cyano, and the like) in at least one of the o, m, or p positions. In the processes used heretofore in which halides, phosphorous, or sulfur were reacted with the sulfonyl reactant at elevated temperatures such electronegative groups also react. Surprisingly, the inclusion of the dimethylamide in the reaction mass, according to the processes of this invention, suppresses such side reactions.

The M in the formula RSO$_3$M represents, as mentioned previously, hydrogen or an alkali or alkaline earth metal, and for reasons of cost and availability will ordinarily be sodium or potassium. Illustrative of the RSO$_3$M reactants which can be employed in practicing processes of the invention are the following acids and the alkaline earth or alkali metal salts thereof, such as the sodium salt: methanesulfonic acid, ethanesulfonic acid, 1-propanesulfonic acid, 2-propanesulfonic acid, 1-butanesulfonic acid, 1-dodecanesulfonic acid, cyclohexanesulfonic acid, cyclopentanesulfonic acid, d-camphor-10-sulfonic acid, benzenesulfonic acid, 1-naphthalenesulfonic acid, 2-naphthalenesulfonic acid, 2-anthraquinonesulfonic acid, 4-pyridinesulfonic acid, 2-thiophenesulfonic acid, p-tolylsulfonic acid, p-methoxybenzenesulfonic acid, p-carbomethoxybenzenesulfonic acid, p-acetoxybenzenesulfonic acid, p-acetylbenzenesulfonic acid, m-acetylbenzenesulfonic acid, o-acetylbenzenesulfonic acid, p-formylbenzenesulfonic acid, m-formylbenzenesulfonic acid, p-cyanobenzenesulfonic acid, p-acetylaminobenzenesulfonic acid, p-chlorobenzenesulfonic acid, p-nitrobenzenesulfonic acid, p-methylmercaptobenzenesulfonic acid, p-phenylmercaptobenzenesulfonic acid, and p-phenylsulfonylbenzenesulfonic acid.

The halogen-supplying reactants in the processes of the invention are represented herein by the formulas SOX$_2$, SO$_2$X$_2$, PX$_3$, PX$_5$, and POX$_3$, where X is chlorine or bromine. Thus the compounds are thionyl chloride, sulfuryl chloride, phosphorous trichloride, phosphorous pentachloride, phosphorous oxychloride, and the bromine analogues thereof. Of these reactants, the thionyl halide and phosphorous pentahalide are preferred because they generally give better yields of the desired product. Also if the dimethyl amide employed in the process is dimethylformamide, there is an advantage in using the thionyl halide rather than the phosphorous pentahalide since the latter reacts vigorously with dimethylformamide liberating much heat to form an addition complex.

The mechanism by which the dimethyl amide modifies the reaction to give the improved processes of this invention is not understood. An understanding of the mechanism is not necessary, however, to successful practice of the improvement. The desired results are attained simply by introducing the dimethyl amide into the reaction system. And therefore regardless of the actual manner of operation of the dimethyl amide, the improved process is conveniently described as one which takes place in the presence of the dimethyl amide.

In carrying out the processes of the invention, the dimethyl amide will ordinarily be employed in amount corresponding to one mol or more for each mol of the organo-sulfonyl reactant, RSO$_3$M. The reaction can be carried out with lesser amounts if desired but the effectiveness of the dimethyl amide as a reaction promoter falls off rapidly as such lesser amounts are used. Much larger amounts than about one mol per mol of RSO$_3$M can be used, the upper limit being merely one of practicality based on such considerations as cost, equipment size, and the like.

Altho it is not necessary, the dimethyl amide is conveniently used in sufficient excess to serve as solvent or liquid diluent in the reacting mass. When so used, the dimethyl amide is present, for example, in amount corresponding to about 10 mols or more per mol of $RSO_3M$. Alternatively, organic liquids which are inert in the process, for example, chloroform, benzene, dioxane, or the like can be used to serve as solvent or diluent for the reaction mass provided, of course, that the dimethyl amide is also present.

The reactants can be brought together for reaction according to various techniques. Thus the halide reactant either alone or in solution in the dimethyl amide can be added to a suspension of the organo sulfonyl reactant in the dimethyl amide or some inert solvent. Alternatively, the organo sulfonyl reactant either alone or in admixture with dimethyl amide can be added to a solution of the halide reactant in the dimethyl amide.

Another method which can be used, altho somewhat less desirable, involves bringing together first the organo sulfonyl reactant and the halide reactant and then adding the dimethyl amide to that mixture. Care should be taken, however, using such a technique if phosphorous pentahalide is the halide reactant because the resulting reaction can be violent upon addition of the dimethyl amide.

In carrying out the processes of the invention, it is preferred to use some excess of the halide reactant in order to obtain optimum yield based on the organo sulfonyl reactant. The optimum excess of the halide reactant varies somewhat with the reactant. For example, if phosphorous pentachloride is used, it is sufficient to employ that amount about 5% in excess of the stoichiometric amount theoretically required to form the desired organo sulfonyl chloride. With thionyl chloride, on the other hand, an excess in the order of 30% is optimum.

As is well known, each of the several halide reactants which can be used in the processes of this invention react readily with water to form mineral acid. It is preferred, therefore, for reasons of economy that the reactants be anhydrous and that water be excluded from the reacting masses, but it is not essential to the operability of the process that rigorously anhydrous conditions be employed.

The optimum temperature in carrying out the processes of the invention will vary with the particular reactants used but in general will be within the range of about 0 to 40° C. The reaction is ordinarily quite vigorous at temperatures in the upper portion of that range and indeed in the case of preparation of a sulfonyl bromide, the reaction is more readily controlled by operating at a temperature in the lower portion, say, about 0° to 15° C. In the preparation of sulfonyl chloride, however, higher temperatures and preferably within the range of about 15° to 30° C. are preferred. The rate of reaction at a given temperature can be controlled somewhat by varying the degree of agitation but since increased yield also results within limits with improved agitation, it is preferred to provide for intimate mixing of the reacting mass.

After completion of reaction, the product can be recovered from the reaction mass by the methods conventionally used for recovery of products from their solution or suspension in a reaction mass. Thus, for example, the reaction mass can be run into a large excess of ice and water whereupon the organo sulfonyl halide ordinarily separates out immediately as an oil or in crystalline form and is readily recovered. Alternatively, the product can be recovered from the reaction mass by the usual solvent extraction methods.

The invention is further illustrated by reference to the following detailed examples. All parts are parts by weight.

Example 1

Two parts of thionyl chloride is dissolved in ten parts of dimethylformamide. To this solution at 20° C. is added two parts of p-toluenesulfonic acid. The reaction mixture is stirred until all the acid has dissolved, the temperature remaining near 20° with no external cooling. The reaction mixture is then run into 100 parts of ice and water, and causes the product to precipitate as a white crystalline solid. After filtration and drying, 1.9 parts of p-toluenesulfonyl chloride, M.P. 67–68° C., is obtained.

Example 2

To a slurry of 666 parts of the anhydrous sodium salt of p-acetylbenzenesulfonic acid in 1500 parts of dimethylformamide is added 645 parts of powdered phosphorous pentachloride gradually and with strong stirring. During the addition the reaction mixture is cooled so that the temperature remained at 18–20° C. After the addition of phosphorous pentachloride is complete, the reaction mixture is stirred for an additional thirty mintues, then run into 6000 parts of ice and water, stirred and the product filtered out. After washing with water and drying, 561 parts of p-acetylbenzenesulfonyl chloride is obtained, M.P. 84–85° C.

Example 3

To a stirred slurry of 111 parts of the anhydrous sodium salt of p-acetylbenzenesulfonic acid in 300 parts of dimethylformamide is added 75 parts of thionyl chlorine. During the addition the temperature is maintained at 18–20° C. The reaction mixture is stirred for additional five minutes, then run into 1500 parts of ice and water, causing the product to precipitate as a crystalline solid. After filtration, washing and drying, 95 parts of p-acetylbenzenesulfonyl chloride is obtained, M.P. 84–85° C.

Example 4

Two parts of phosphorous trichloride is dissolved in ten parts of dimethylformamide cooled in ice. Heat is evolved. With temperature at 18° C., two parts of the anhydrous sodium salt of p-acetylbenzenesulfonic acid is added, and the mixture stirred until the salt dissolves. Thereupon the reaction mixture is run into 40 parts of ice water, causing the product to precipitate as a crystalline solid. After filtration, washing and drying, 1.16 parts of p-acetylbenzenesulfonyl chloride is obtained, M.P. 84–86° C.

Example 5

To a stirred slurry of 222 parts of the anhydrous sodium salt of p-acetylbenzenesulfonic acid in 500 parts of dimethylformamide, one adds slowly 192 parts of phosphorous oxychloride. During the addition the temperature is maintained at 16–20° C. After the addition of phosphorous oxychloride is complete, the reaction mixture is stirred for fifteen minutes, and then run into 2000 parts of ice and water, causing the product to crystallize. After filtration, washing with water and drying, 140 parts of p-acetylbenzenesulfonyl chloride is obtained, M.P. 84–86° C.

Example 6

Ten parts of dimethylformamide is cooled to 5° C. and 2.4 parts of phosphorous tribromide is added dropwise, the temperature being maintained below 10° C. To the solution thus formed, 1.6 parts of the anhydrous sodium salt of p-acetylbenzenesulfonic acid is added with stirring and cooling. After the salt dissolves, the temperature is allowed to rise to 25° C. over ten minutes and the mixture is then run into 40 parts of ice and water, causing the separation of the product as pale yellow crystals. After filtration and drying, 1.22 parts of p-acetylbenzenesulfonyl bromide is obtained, M.P. 67–73° C.; M.P. after recrystallization from heptane is 76–77.5° C.

Example 7

Two parts of phosphorous pentachloride is dissolved in ten parts of dimethylformamide. To this solution is added 1.4 parts of anhydrous sodium p-toluenesulfonate, the mixture is stirred for five minutes at room temperature and then run into ice and water, causing the product to crystallize out. After filtration, washing and drying, 1.22 parts of p-toluenesulfonyl chloride, M.P. 66–68° C., is obtained.

Example 8

Four parts of phosphorous pentachloride is dissolved with cooling in twenty parts of tetramethylurea. A large amount of heat is evolved. To this solution is added 2.8 parts of anhydrous sodium p-toluenesulfonate, the mixture is stirred for five minutes at 20° C., then run into ice and water, causing the product to crystallize out. After filtration, washing and drying, 1.4 parts of p-toluenesulfonyl chloride, M.P. 62–64° C., is obtained.

Example 9

One part of thionyl chloride is dissolved in ten parts of dimethylformamide. To this solution is added two parts of sodium d-camphor-10-sulfonate, the mixture is stirred for five minutes at room temperature, and then run into 40 parts of ice water, causing the product to crystallize. After filtration, washing and drying, 1.52 parts of d-camphor-10-sulfonyl chloride, M.P. 63–65° C., is obtained.

Example 10

Two parts of phosphorous pentachloride is dissolved in ten parts of dimethylacetamide. To this solution is added two parts of sodium d-camphor-10-sulfonate, the mixture is stirred at room temperature until the salt dissolves, and then run into 40 parts of ice water, causing the product to crystallize. After filtration, washing and drying, 1.14 parts of d-camphor-10-sulfonyl chloride, M.P. 64–66° C., is obtained.

Example 11

Two parts of sodium d-camphor-10-sulfonate is added to a rapidly stirred solution of two parts thionyl chloride and 0.15 part of dimethylformamide in six parts of dioxane at 25° C. The mixture is stirred for thirty minutes and then poured into 30 parts of ice and water causing the product to crystallize. After filtering and drying, 0.3 part of d-camphor-10-sulfonyl chloride is obtained.

Any departure from the detailed description herein which conforms to the principle of the invention, namely, to the use of a dialkyl amide of the kind herein defined as an aid in promoting the preparation of an organo sulfonyl chloride or bromide by the reaction of the corresponding organosulfonic acid or metal salts thereof with a halogenating agent of the kind defined herein, is intended to be included within the scope of the claims below.

I claim:

1. In a process for preparing an organo sulfonyl halide represented by the formula $RSO_2X$, where R is an electronegatively substituted phenyl radical and X is a member of the group consisting of chlorine and bromine, by effecting reaction between (1) a halide of the group consisting of compounds represented by the formulas $SOX_2$, $SO_2X_2$, $PX_3$, $PX_5$, and $POX_3$, where X is the same as in the aforementioned $RSO_2X$, and (2) an organosulfonyl compound represented by the formula $RSO_3M$, where R is the same as in the aforementioned $RSO_2X$ and M is a member of the group consisting of hydrogen, alkali metal, and alkaline earth metal, the step comprising mixing (1) and (2) in contact with a dimethyl amide represented by the formula $ZCON(CH_3)_2$, where Z is a member of the group consisting of hydrogen, methyl, and dimethyl amino.

2. In a process for preparing an organo sulfonyl halide represented by the formula $RSO_2X$, where R is a monovalent aryl radical having at least one electronegative substituent and X is a member of the group consisting of chlorine and bromine, by effecting reaction between (1) a halide of the group consisting of compounds represented by the formulas $SOX_2$, $PX_3$, $SO_2X_2$, $PX_5$, and $POX_3$, where X is the same as in the aforementioned $RSO_2X$, and (2) an organo sulfonyl compound represented by the formula $RSO_3M$, where R is the same as in the aforementioned $RSO_2X$ and M is a member of the group consisting of hydrogen, alkali metal, and alkaline earth metal, the step comprising mixing (1) and (2) in contact with dimethylformamide.

3. A process for preparing p-acetylbenzenesulfonyl chloride which comprises reacting phosphorous pentachloride with sodium p-acetylbenzenesulfonate in the presence of dimethylformamide.

4. A process for preparing p-acetylbenzenesulfonyl chloride which comprises effecting reaction between thionyl chloride and sodium p-acetylbenzenesulfonate by mixing them in contact with dimethylformamide.

5. A process for preparing p-formylbenzenesulfonyl chloride wihich comprises reacting phosphorous pentachloride with sodium p-formylbenzenesulfonate in the presence of dimethylformamide.

6. A process for preparing p-formylbenzenesulfonyl chloride which comprises reacting thionyl chloride with sodium p-formylbenzenesulfonate in the presence of dimethylformamide.

7. A process for preparing p-acetylbenzene sulfonyl chloride which comprises effecting reaction between thionyl chloride and sodium p-acetylbenzenesulfonate by mixing them at a temperature of from 0 to 40° C. in contact with dimethyl formamide, the proportion of thionyl chloride being up to 30% in excess of the stoichiometric amount theoretically required, and the proportion of dimethyl formamide being at least one mol for each mol of thionyl chloride.

References Cited in the file of this patent

UNITED STATES PATENTS

| | | |
|---|---|---|
| 2,383,319 | Kaharasch | Aug. 21, 1945 |
| 2,741,659 | Schmid et al. | Apr. 10, 1956 |

FOREIGN PATENTS

| | | |
|---|---|---|
| 690,448 | Great Britain | Jan. 22, 1951 |

OTHER REFERENCES

Shepherd et al.: 12 J. Org. Chem., 449 (1947).
Kulka: 72 J.A.C.S., 1216 (1950).
Ray et al.: Journal of Organic Chemistry, vol. 15, p. 1039 (1950).
Adams et al.: Journal of American Chem. Soc., vol. 74, p. 3171 (1952).
Wagner et al.: Synthetic organic Chemistry (1953), p. 821.
Gilman et al.: Organic Syntheses, Collective, vol. I, p. 9.